US 6,735,702 B1

(12) United States Patent
Yavatkar et al.

(10) Patent No.: US 6,735,702 B1
(45) Date of Patent: May 11, 2004

(54) METHOD AND SYSTEM FOR DIAGNOSING NETWORK INTRUSION

(75) Inventors: Rajenda Yavatkar, Portland, OR (US); David M. Putzolu, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/386,586

(22) Filed: Aug. 31, 1999

(51) Int. Cl.[7] ................................. G06F 1/24

(52) U.S. Cl. ................ 713/201; 713/190; 713/194; 713/200

(58) Field of Search ............... 713/190, 194, 713/200, 201

(56) References Cited

U.S. PATENT DOCUMENTS 6,088,804 A * 7/2000 Hill et al. .................... 713/201
6,336,139 B1 * 1/2002 Feridun et al. .............. 709/224
6,418,463 B1 * 7/2002 Blevins ....................... 709/202

OTHER PUBLICATIONS

ObjectSpace: Voyager Press Releases, *ObjectSpace, Inc. Announces Voyager™, The World's First Platform for Agent-Enhanced Distributed Computing in Java™*, http://www.objectspace.com/company/vgrpress, Apr. 2, 1997, pp. 1–4.
Mitsuru Oshima, Guenter Karjoth and Kouichi Ono, *Aglets Specification 1.1 Draft*, Sep. 8, 1998, http://www.trl.ibm.co.jp/aglets/spec11.html, , pp. 1–43.

Danny B. Lange, IBM Tokyo Research Laboratory, *Java Aglet Application Programming Interface (J–AAPI) White Paper—Draft 2*, http://www.trl.ibm.com.jp/aglets, Feb. 19, 1997, pp. 1–6.

IBM Co., *Aglets Software Development Kit—About Aglets* (visited Jul. 26, 1999), http://www.trl.ibm.co.jp/aglets/about.html, pp 1–2.

ObjectSpace, *Voyager Core Technology Version 2.0 Now Available* (visited Jan. 12, 1999) http://www.objectspace.com/products/voyager/core/index.html, pp. 1–8.

Bob Stewart, Cisco Systems, Inc., *Internet Draft Notification Log MIB*, http://www.ietf.org/internet–drafts/draft–ietf–disman–notif–log–mib–10.txt, Jun. 24, 1999 (visited Aug. 18, 1999), pp. 1–5 of 20 (code on pp. 6–20 available at http://www.ietf.org/internet–drafts/draft–ietf–disman–notif–log–mib–10.txt.

Bob Stewart, Cisco Systems, Inc., *Internet Draft Distributed Management Event MIB*, http://www.ietf.org/internetdrafts/draft–ietf–disman–event–mib–07.txt, Jun. 25, 1999 (visited Aug. 18, 1999), pp. 1–5 of 38 (code on pp. 6–38 available at http://www.ietf.org/internet–drafts/draft–ietf–disman–event–mib–07.txt).

(List continued on next page.)

*Primary Examiner*—Thomas R. Peeso
(74) *Attorney, Agent, or Firm*—Kenyon & Kenyon

(57) ABSTRACT

A method and system are disclosed for analyzing traffic on a network by monitoring network traffic and, when a particular network condition (for example, a network attack) is detected, gathering information about the traffic on the network by launching an agent and having the agent iteratively identify which of the links on the node on which the agent operates accepts a type or class of traffic, traverse the identified link to the node across the link, and repeat the process.

25 Claims, 9 Drawing Sheets

OTHER PUBLICATIONS

Bob Stewart, Cisco Systems, Inc., *Internet Draft Distributed Management Expression MIB*, http://www.ietf.org/internet-drafts/draft–ietf–disman–event–mib–09.txt, Jun. 25, 1999 (visited Aug. 18, 1999), pp. 1–9 of 33 (code on pp. 10–33 available at http://www.ietf.org/internet–drafts/draft–ietf–disman–event–mib–09.txt).

Kenneth White, IBM Corp., *Definitions of Managed Objects for Remote Ping, Traceroute, and Lookup Operations*, http://www.ietf.org/internet–drafts/draft–ietf–disman–remops–mib–06.txt, Aug. 1999 (visited Aug. 18, 1999), pp. 1–10 of 60 (code on pp. 11–60 availabale at http://www.ietf.org/internet–drafts/draft–ietf–disman–remops–mib–06.txt.

D. Levi, Nortel Networks, J. Schoenwaelder, TU Braunschweig, *Definitions of Managed Objects for Scheduling Management Operations*, ftp://ftp.isi.edu/in–notes/rfc2591.txt, May 1999 (visited Aug. 19, 1999), pp. 1–5 of 22 (code on pp. 6–22 available at ftp://ftp.isi.edu/in–notes/rfc2591.txt.

D. Levi, Nortel Networks, J. Schoenwaelder, TU Braunschweig, *Definitions of Managed Objects for the Delegation of Management Scripts*, ftp://ftp.isi.edu/in–notes/rfc2592.txt, May 1999 (visited Aug. 19, 1999), pp. 1–10 of 47 (code on pp. 11–47 available at ftp://ftp:isi.edu/in–notes/rfc2591.txt.

\* cited by examiner

METHOD AND SYSTEM FOR DIAGNOSING NETWORK INTRUSION

BACKGROUND OF THE INVENTION

I. This invention relates to computer systems, in particular to network environments.

II. BACKGROUND INFORMATION

Organizations use networks such as local area networks or wide area networks to share information and capabilities among nodes and to allow users to communicate and exchange information. Such networks consist of numerous nodes connected by links. Each node may include networking equipment such as ports (also known as an interfaces), which translate signals between the formats used by links and those used by nodes. Nodes may connect to multiple links, and each node has one port for each link to which it connects. Each node may perform various functions; for example a node may at the same time run user applications and act as a network management console. A node may also be termed a host or a device, and may be a PC, workstation or laptop running a user application program, a router, an application gateway, a server, or any other device attached at some point in time to a network.

One method for allowing network nodes to communicate is the TCP/IP transport protocol. Modules on different nodes may use TCP/IP as a protocol to communicate with each other via a network. Every node connected to a network using TCP/IP has an internet protocol ("IP") address, which consists of four numbers, each separated a period. This IP address may be used to name the node. Some nodes may have more than one IP address.

As network use and the complexity of networks increase, managing networks and diagnosing network problems become more difficult. One area of network management presenting difficulties is diagnosing and responding to network attacks. Modern computer networks are vulnerable to various types of attacks from within and without the network. For example, one category of attacks involves sending a flood of attack traffic to a device on a network; the flood of messages consumes network resources, prevents the network from being used for its intended purpose, and may cause equipment to overload or crash. To halt the attack the source of the attack traffic is detected and action may be taken; for example the source of the attack may be disconnected from network links allowing it to propagate hostile messages. When used herein, attack traffic may refer to any traffic which is sent to interrupt network operations or damage network equipment, processes or data. Attack traffic typically is purposefully sent but may also include traffic which is inadvertently sent which has similar results—for example, from an out of control process.

The source of attacks may be difficult to diagnose due to the nature of typical network architecture and due to subterfuge methods an attacking machine may use. While normally a network packet identifies the sender of the packet, a device sending hostile messages may disguise this through IP spoofing, where a false source IP address is inserted in sent packets. In addition, on a network having multiple gateways to other networks, it may not be readily apparent which of the multiple gateways is allowing a flood of hostile messages to enter the network.

Systems exist for collecting information about network traffic. For example, to determine the node which is the source of attack traffic (or the gateway allowing such traffic into a network, which in such a case may be considered a source) and the path or paths taken by such traffic, a human operator may access each link at a node receiving such traffic and analyze the incoming traffic using a sniffer. A sniffer is a device which may record network statistics at a node. The operator may identify which of the physical links attached to the node is receiving a certain type or amount of traffic and then move to the node on the other end of the identified link. The path or paths of traffic from the source of the traffic may be found by traversing the network from node to node, using the sniffer at each node in a path, until the source is reached. Such a diagnosis is slow and inaccurate. A similar analysis may be performed from a central console which may query remote nodes for information about the source of incoming traffic. Such a diagnosis is also slow and inaccurate, as it requires commands to nodes and responses from nodes to be transmitted across the network. The speed at which attacks occur and the speed at which such problems must be fixed makes such detection methods ineffective. A path taken by traffic may be described as the equipment traversed by traffic as the traffic crosses a network or networks (e.g., a series of nodes and links, or a series of sub-networks).

Diagnosing network attacks may thus require the distributed state of the network to be known—e.g., what type of traffic is being received at which devices and through which ports, and the path or paths taken by the traffic. Certain information about the state of a network may only be gathered accurately and quickly at the individual nodes distributed throughout a network—for example, the particular port receiving a certain type of attack traffic. Currently, gathering such information requires that an operator physically access individual nodes, e.g., by using a sniffer, or that a central console query remote nodes. Such methods are slow, inefficient and inaccurate. The time taken to perform current diagnosis operations results in inaccuracy, as the state of a network is determined over a period of time. Delays may also occur, if (as may happen during a network attack), data transmission over links is interrupted or halted. The state of a network is not always accurately viewed from one central point which has only indirect access to the state of remote network nodes. Evidence of the source of attack traffic exists with greater certainty nearer the source of the traffic.

Therefore there exists a need for a system and method allowing for the distributed state of a network, such as information about attack traffic, to be quickly and accurately collected. A system and method are needed for quickly and accurately diagnosing network attacks by determining information such as the source of, or a partial path of, attack traffic.

SUMMARY OF THE INVENTION

A method and system are disclosed for analyzing traffic on a network by monitoring network traffic and, when a particular network condition (for example, a network attack) is detected, gathering information about the traffic on the network by launching an agent and having the agent iteratively identify which of the links on the node on which the agent operates accepts a type or class of traffic, traverse the identified link to the node across the link, and repeat the process.

DESCRIPTION

I. Overview

Figure 1:
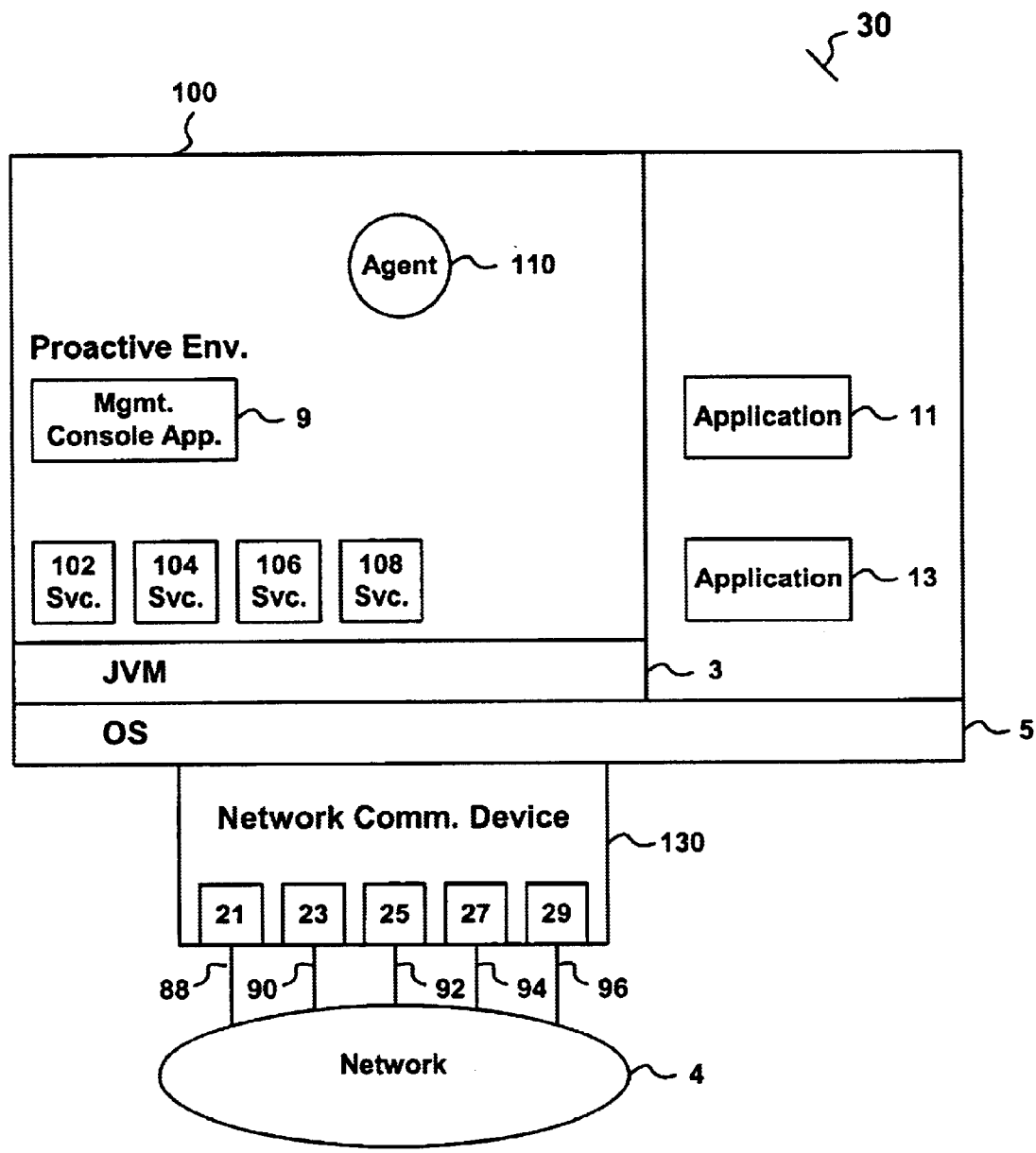
FIG. 1 is a block diagram illustrating a network node according to an embodiment of the present invention.

The system and method of an exemplary embodiment of the present invention use agents—mobile software modules—to collect data on the state of a network during a network attack, allowing for more accurate diagnosis of an attack. During a network attack, the system and method of the present invention allow for details on the attack traffic (e.g., the source of the attack traffic and path of the attack traffic) to be gathered. The source of the attack traffic may be the originator of the attack traffic or, for example a gateway allowing attack traffic to enter a network and which is, in effect, the source of attack traffic to the network. Such information then may be used to halt the attack or insulate the network from the attack.

When used herein, an agent is a software module having the capability to move from node to node on a network and to execute on the nodes to which it moves. In an exemplary embodiment of the present invention an agent may be, for example, an application functioning to detect or diagnose a network attack, but may also provide other functionality, such as altering a routing table or serving as a user application.

In an exemplary embodiment of the system and method of the present invention, a network attack is detected and diagnosed by two types of agents. A first type of agent, a watchdog agent, is positioned at selected network nodes. On detecting network attack, a watchdog agent creates a second type of agent, a bloodhound agent, which analyzes attack traffic by moving through the network and gathering information. The watchdog agent remains stationary.

The bloodhound agent is a mobile agent capable of executing on a node of a network, stopping execution, transporting itself to another node, and resuming execution. In an alternate embodiment, a stationary watchdog agent may not be needed; a bloodhound agent may collect data without the prompting or direction of such a watchdog agent. Furthermore, the watchdog agent may exist as a process other than an agent; for example, a process functioning as a does a watchdog agent may be a C++ application.

In an exemplary embodiment of the present invention, a watchdog agent monitors the node on which it operates for traffic having characteristics of a network attack. A watchdog agent may also monitor for and detect a network attack at a device other than the device on which it operates. On detecting an attack the watchdog agent launches one or more bloodhound agents to trace the attack traffic. The watchdog agent launches various types of bloodhound agents based on the type of attack detected; each bloodhound agent is designed to trace traffic from one type of attack. In an exemplary embodiment a bloodhound agent moves across the network, tracing the path or paths taken by attack traffic. To trace attack traffic, the bloodhound agent follows an iterative process of finding the port for the link on the node on which it operates which is accepting attack traffic, attempting to traverse that link (i.e., to move to the node on the other side of the link) to a new node, and, once at the new node, again finding the port and link which are accepting attack traffic. In such a manner the path or paths, or a portion of the path or paths, of attack traffic between the source of the attack traffic and the target node may be found. After gathering such information a bloodhound agent reports to the watchdog agent, which, in turn, may report to a human operator or, possibly, attempt to halt the attack. A target node is a node to which attack traffic is directed or which attack traffic affects.

Gathering information about a network attack using mobile agents is much quicker than gathering such information by having a human operator travel from node to node, and is also quicker than polling nodes from a central location. Network attacks may start and stop quickly; the only effective diagnosis may be one that takes place during this brief period. Mobile agents may determine, without exchanging information or commands from a central location or human operator, which path to take to further investigate an attack. Since communication between a central console and a remote node is not required, a finer granularity of information may be collected and acted upon. Accuracy is improved by the speed at which agents may gather, process, and act on information.

An agent may require a mobile agent environment or platform to operate and may not be able to operate on every node on a network. An exemplary embodiment of the system and method of the present invention uses a particular mobile agent environment, termed a proactive environment, to create and support mobile agents. Alternate embodiments may use other systems to provide agents with such capabilities. For example, other mobile agent environments may be used, or types of agents may be used which may operate without the aid of such an environment.

II. Proactive Environment

An exemplary embodiment of the system and method of the present invention requires agents to be able to migrate among nodes, executing and performing tasks at each node, and to have access to resources at each node. An exemplary embodiment uses a particular mobile agent environment, termed a proactive environment, to create and support agents with these capabilities. Alternate embodiments may not require the particular mobile agent environment described herein, or may not require a mobile agent environment separate from an operating system.

An embodiment of the proactive environment used with the present invention allows mobile agents to operate on network nodes and access node and network resources through services. Resources may be any data structure, function, or physical component to which a node allows access. For example, a resource may be the ability to create and alter files; such a resource is normally provided by an operating system. A resource may be a port, the ability to send Simple Network Management Protocol ("SNMP") messages, or the ability to execute a native code (e.g., machine code) component. A resource may also be the ability to output information to a display (e.g., a CRT or flat panel display), produce sounds, or accept keyboard or pointing device input.

In an exemplary embodiment of the present invention, a proactive environment exists on each of multiple nodes in a network; one proactive environment exists on each node which may support a proactive environment. Each proactive environment can create agents (and is thus the agents' "launch point"), provides a platform allowing agents to run, allows agents access to resources through services, monitors and controls agents, allows agents to travel via the network to other proactive environments, may receive agents transmitted from other proactive environments, and in addition may perform other network administration functions. A proactive environment enables an agent to operate on one node, stop execution, transfer to another node, and resume execution.

In an exemplary embodiment, an agent may access certain resources only if the agent has permission to do so. Services are used to allow agents restricted access to resources by acting as intermediaries between the agents and the underlying resources. Services may allow access to resources (e.g., a routing table) or may emulate the function of resources (e.g., executing nonJava code). For example, a service altering a routing table may accept a routing table entry to be altered. Security is provided, as agents require permissioning to use services, and services may constrain access to resources. Permissioning is achieved by having each agent carry with it an access control list which is a permission list determining which services it may access, and other security information. Services may grant access to resources in a node, platform, and application independent manner.

In an exemplary embodiment services may be circumscribed, or may be tailored based on agent permissioning. Services may be circumscribed in that a service may allow access to only a portion of an underlying resource. Services may be tailored in that a service may allow access to only portions of underlying resources based on agent permissioning—different agents, having different permissioning, may be able to access different aspects of resources.

Referring to the figures in which like numbers indicate like elements, FIG. 1 is a block diagram illustrating a network node 30 according to an embodiment of the present invention. Node 30 may be a standard personal computer or another type of data processing device, and in addition, may include components not traditionally found in a standard personal computer. Node 30 is a device connected to a network 4 via network communications device 130. Node 30 includes proactive environment 100, which includes services 102, 104, 106 and 108 and which provides an environment on which agents, such as agent 110, may run. Node 30 includes operating system ("OS") 5, providing overall control of node 30; Java$^J$ virtual machine ("JVM") 3, providing a platform on which proactive environment 100 operates; and management console application 9, providing a user interface for monitoring and control of proactive environment 100 and other entities. Node 30 includes applications 11 and 13, providing functionality, such as word processing, to a user. Services 102–108 provide agent 110 access to resources, such as access to network 4, OS 5, or other resources.

Network 4 provides connectivity and communications with other networks (not shown) and with other network nodes (not shown). Network communications device 130 allows node 30 to connect to network 4 via links 88, 90, 92, 94, and 96, which connect to other nodes in network 4 (not shown). Network communications device 130 includes ports 21, 23, 25, 27 and 29, which translate signals between the formats and methods used by links and those used by nodes (e.g., between an analog format used by a link and a digital format used by a node), and which possibly perform other functions.

Configuration and control of node 30, agent 110, services 102–108, and also of other nodes, agents, and services which may exist on nodes which are part of network 4 may be accomplished through management console application 9, which allows a human operator to communicate with, monitor, and send commands to proactive environments and other entities.

In an exemplary embodiment of the present invention proactive environment 100 creates agents, provides a platform allowing agents to run, monitors and controls agents, allows agents to travel via network 4 to other proactive environments, may receive agents transmitted from other proactive environments, and in addition may perform other functions. Proactive environment 100 interfaces with a human operator using management console application 9. Proactive environment 100 is a Java$^J$ object which runs on JVM 3, itself a program running on node 30. Proactive environment 100 is implemented as an extension of the Voyager$^J$ system, which defines a Java$^J$ program allowing agents to operate. Alternate embodiments of the system and method of the present invention may use alternate forms of the proactive environment described herein, or may not require the use of a proactive environment.

In an exemplary embodiment proactive environment 100 provides an interface to agent 110 including services 102–108. Services 102–108 are Java$^J$ classes which may be instantiated as objects which run on the JVM 3; the objects contain methods which accept inputs from agents and allow agents access to resources. Services are members of a proactive environment; services 102–108 are members of proactive environment 100. Agent 110 may access services 102–108 by requesting proactive environment 100 to instantiate a service object; the agent then may invoke methods of the service object, which are Java$^J$ methods. Services may, if so created, have access to any resource on node 30 or network 4 to which JVM 3 itself has access, e.g., file creation, SNMP messages, routing tables, or display output.

Figure 2:
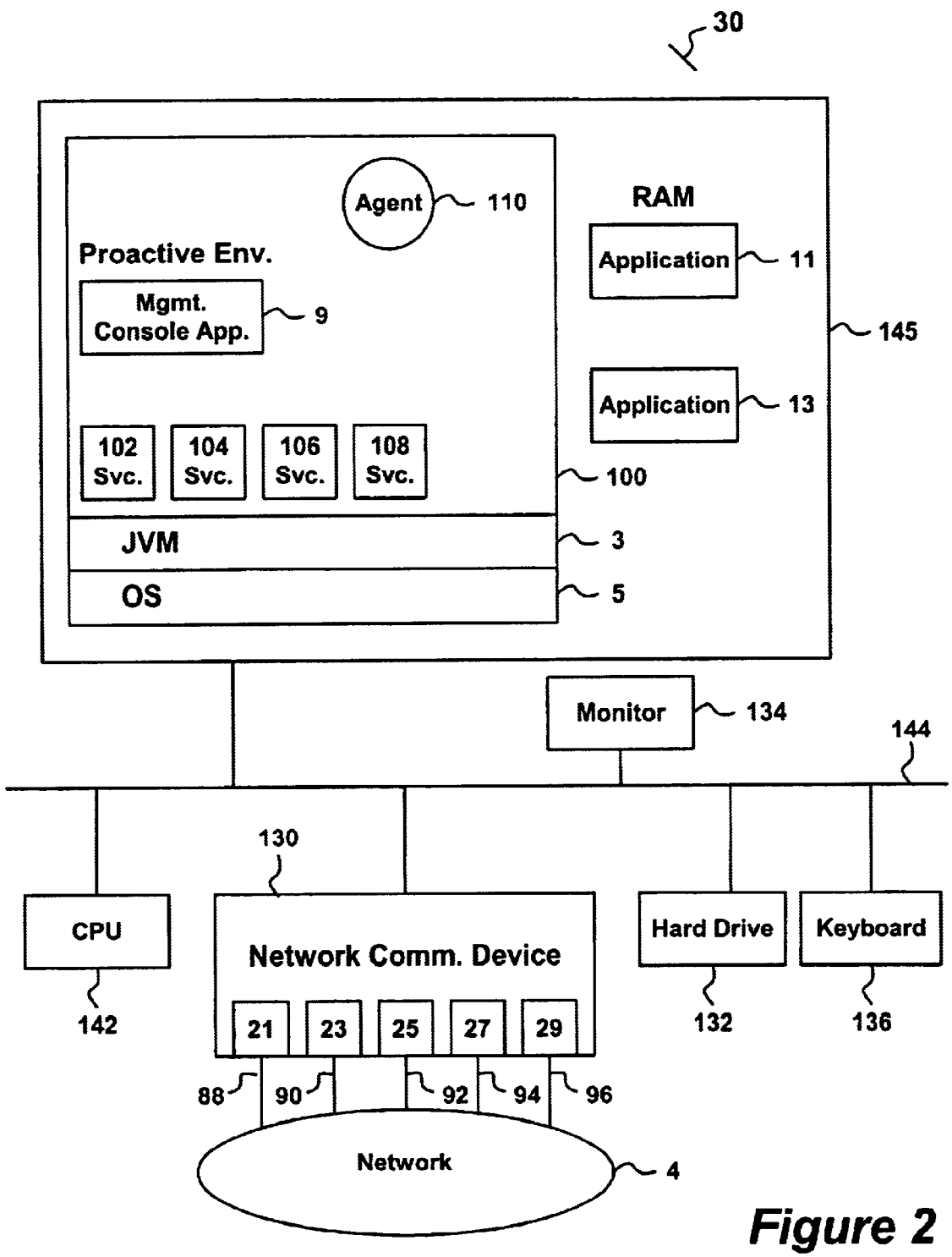
FIG. 2 is a block diagram illustrating the node of FIG. 1 according to an embodiment of the present invention.

FIG. 2 is a block diagram illustrating node 30 of FIG. 1 according to an embodiment of the present invention. FIGS. 1 and 2 illustrate node 30 from different aspects; thus like numbered components are identical in function and structure. Node 30 includes a central processing unit ("CPU") 142 connected to a system bus 144. CPU 142 executes instructions and controls the operation of node 30. CPU 142 may be, for example, a Pentium® processor available from Intel® Corp. System bus 144 allows the various components of node 30 to communicate, and may alternately include a plurality of busses or a combination of busses and bus bridge circuits. Node 30 further includes RAM 145, providing non-permanent storage of data and program instructions; and a plurality of peripheral devices 130, 132, 134, and 136, including keyboard 136, allowing user input; network communications device 130; hard disk drive 132, allowing for long term storage of information; and monitor 134, displaying information to a user. Node 30 may include other peripheral devices not shown, such as a printer or a mouse.

Node 30 includes OS 5, JVM 3, management console application 9, agent 110, proactive environment 100, services 102, 104, 106 and 108, and applications 11 and 13. Services 102–108 provide agent 110 access to resources, such as access to network communications device 130, hard disk drive 132, monitor 134, OS 5, or other resources. A portion of application programs 11 and 13, proactive environment 100, services 102–108, agent 110, JVM 3, management console application 9, and OS 5 are stored in RAM 145, are executed by CPU 142, and to an extent control the operation of node 30 in cooperation with other components such as CPU 142.

Network communications device 130 allows node 30 to connect to network 4 via links 88, 90, 92, 94, and 96, which connect to other nodes in network 4 (not shown). Network communications device 130 includes ports 21, 23, 25, 27 and 29, which translate signals between the formats used by links and those used by nodes, and which possibly perform other functions. Each of ports 21–29 maintains information about its functioning, such as discard counts and queue lengths. Packets may be dropped by a port if its buffers become full when the port receives packets at a rate which is faster than the rate it can send the packets to its host node. The average queue length of a buffer in a port is a measure of how full the buffer is. This information is available to processes running on node 30, and may be available to agents running on node 30 or on other nodes (not shown), through the use of services.

Figure 3:
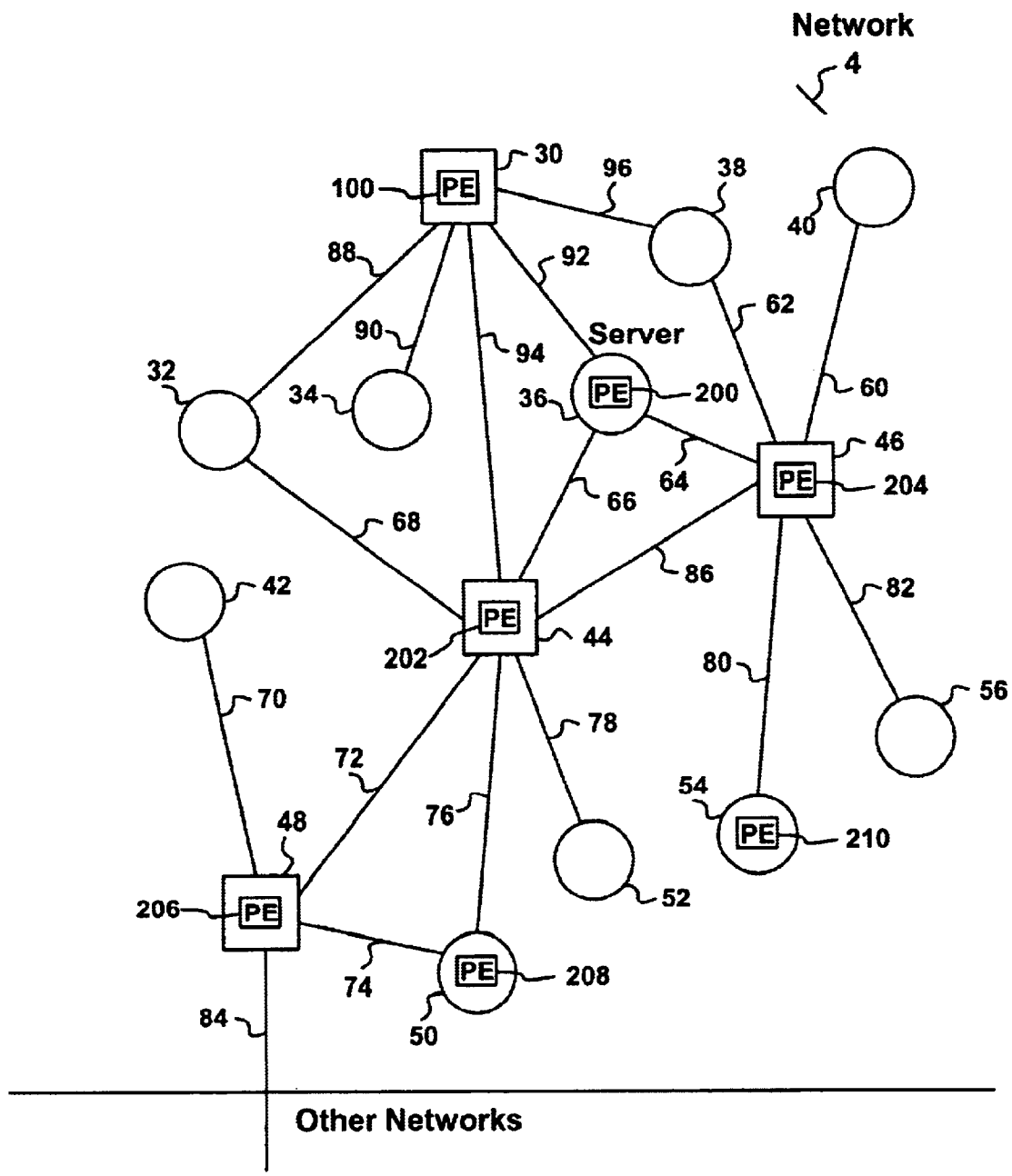
FIG. 3 is a block diagram illustrating the network of FIG. 1 according to an embodiment of the present invention.

FIG. 3 is a block diagram illustrating network 4 of FIG. 1 according to an embodiment of the present invention. In an exemplary embodiment network 4 includes nodes 30, 32, 34, 36, 38, 40, 42, 44, 46, 48, 50, 52, 54 and 56, providing user functionality, routing traffic, providing network security, and performing other functions; and links 60, 62, 64, 66, 68, 70, 72, 74, 76, 78, 80, 82, 84, 86, 88, 90, 92, 94 and 96, connecting and transmitting data between nodes 30–56. Links 60–96 may be, for example, coaxial cable, twisted pair cable, or fiber-optic cable, but can be any transmission medium capable of transporting traffic. In alternate embodiments, the system and method of the present invention may work with networks having a structure other than that described.

Node 48 is a gateway, providing network 4 access to other networks, such as the Internet, and acting as a firewall. Link 84 transmits data between node 48 and other networks. Nodes 30, 44, 46 and 48 are routers, accepting traffic and routing the traffic to destinations, or to other nodes which then forward the traffic to destinations. Nodes 32, 34, 38, 40, 42, 50, 52, 54, and 56 are PCs, supporting applications and providing functionality to users, such as word processing functionality. Node 36 is a file server, storing files and allowing other nodes access to the files; node 36 has some routing capability. Nodes 30 and 44 support management console applications. Management console application 9, supported by node 30, is depicted in FIG. 1; for the sake of clarity the management console application on node 44 is not depicted. While nodes having certain definitions and functions are depicted, the nodes of network 4 may be any devices, for example, workstations.

Nodes 30, 36, 44, 46, 48, 50 and 54 maintain proactive environments 100, 200, 202, 204, 206, 208 and 210, respectively. Each node on which agents may operate maintains a proactive environment. In an exemplary embodiment of the present invention all nodes which are involved in network functions (e.g., routers, firewalls, management devices) and which may support an mobile agent environment such as a proactive environment do so (some nodes on a network may not have the ability to support a proactive environment). Some nodes not involved in network functions, such as PCs providing user functionality, may also support an mobile agent environment.

Nodes 30–56 may communicate using the physical network (i.e., links 60–96 and nodes 30–56) and various layers of protocols. Similarly, objects, such as agents and proactive environments, and applications, may communicate using network 4 and various protocols. Such methods are well known in the networking art.

Each proactive environment on network 4 creates agents, provides an operating environment for agents, allows agents to migrate among nodes which are part of network 4, monitors and controls agents, and provides agents access at each node to a certain set of resources. An agent existing on a proactive environment on one node of network 4 may move to a proactive environment on another node. For example, an agent running on node 36 may move, via link 66, to node 44. Proactive environments and agents communicate with other proactive environments or agents, both within a node or across a network, using a service which transmits messages. The service uses a remote procedure call ("RPC") system, defined by the Voyager$^J$ system. Messaging techniques using RPC methods are known.

In an exemplary embodiment an agent is instantiated by a proactive environment using the Java$^J$ language "new" keyword; a variable referencing the agent is returned to the proactive environment. Each proactive environment and instantiated agent has a unique name, stored as a string. Each instantiated agent may be referred to initially by the local variable used to refer to the object when it is created. Each agent may be referred to globally by its agent name.

In an exemplary embodiment of the present invention, the various types of agents which carry out the functionality of the system and method of the present invention are mobile Java$^J$ objects which may run within a proactive environment. Proactive environments may be hosted on devices running a JVM. A base "agent" object class provides an agent with basic functionality, such as the ability to migrate from node to node, permissioning capability, the ability to communicate with proactive environments and other agents, and the ability to use services. Additional capabilities may be provided by creating subclasses of the agent base class. Each type of agent is given unique functionality in addition to the functionality provided by a base class or an enhanced base subclass (e.g., the ability to function as a firewall) by adding a work object (a Java$^J$ object) and possibly one or more worksheets (objects containing Java$^J$ language code or code in another language). A subclass of the agent base class includes methods to add a work object and worksheets to instantiated agents.

When an agent begins execution at a node, a controlling method (the first method to be started when an agent is invoked) executes the work object; the work object may invoke a worksheet. A work object may invoke a different worksheet at each different node or may invoke the same worksheet at each node. A work object may have only one worksheet available, and thus may not make a choice based on a current node, or may not use worksheets. In an exemplary embodiment worksheets are objects which are members of an agent. A worksheet may be a Java$^J$ language worksheet or a non-Java$^J$ language worksheet. A work object invokes a non-Java$^J$ language worksheet by passing the object to a service, which emulates the running of the worksheet in the language of the worksheet. A Java$^J$ worksheet is executed by calling the worksheet. Creating a base class and enhancing its features with additional functionality by creating subclasses is well known in the Java™ language and object oriented programing arts.

After an agent is instantiated, a work object and worksheets which provide unique functionality may be added to the agent by invoking a method which is a member of the agent. The method is passed the work object and worksheets.

In an alternate embodiment each type of agent is given unique additional functionality by adding class members (methods and variables) to the base agent class definition; each type of agent is a subclass of the agent base class. Alternate embodiments may provide different methods for varying functionality of agents. For example, work objects and worksheets may be created using different methods, or may not be used.

Referring to FIG. 3, an agent according to an exemplary embodiment of the present invention is capable of executing on a mobile agent environment (specifically a proactive environment) installed on one node of network 4, stopping execution, transporting itself along with state information to a mobile agent environment on another node of network 4, and resuming execution. In an exemplary embodiment the state includes information contained in members of the agent, such as data, a work object, worksheets, and an access control list. However, in alternate embodiments an agent's state may include any data created when an agent is instantiated or after an agent is instantiated, for example associated information stored as agent members, or the point at which the agent stopped execution, possibly in the form of an instruction pointer.

In an exemplary embodiment of the present invention, an agent moves by invoking a move method of the agent, defined in the agent base class, which accepts a location (in the form of a string) referring to a destination proactive environment. The agent's move method calls a move method of the proactive environment on which the agent operates. The proactive environment in turn moves the agent object by halting the agent and transmitting its code and data via the network to the target proactive environment. The proactive environment uses Java™ serialization to serialize the agent, storing all agent member variables in a file or in RAM. This data is transmitted to the destination proactive environment as a buffer of bytes along with the agents's code, which is stored in the form of a Java™ class file. Agent information is encrypted before it is sent and decrypted by the receiving proactive environment. The receiving proactive environment uses Java™ methods to load the agent based on the .class file and instantiate the agent's members based on the received agent data. The receiving proactive environment determines from the agent's access control list if the agent has permission to operate. If, according to the access control list, the agent does not have permission to operate on the proactive environment, the proactive environment which launched the agent is informed; if that proactive environment launched the agent due to a command from another application (e.g., a management console application) the proactive environment may inform that application.

If the agent does have permission, the proactive environment starts executing the agent by calling the agent's controlling method. The controlling method starts the operation of the agent. The controlling method may invoke the work object to operate the agent or may operate the agent itself The work object may then in turn call a worksheet. The work object may query the proactive environment for the proactive environment's name and, based on this name, determine which worksheet is to be invoked. Alternate methods of moving agents may be used.

Figure 4:
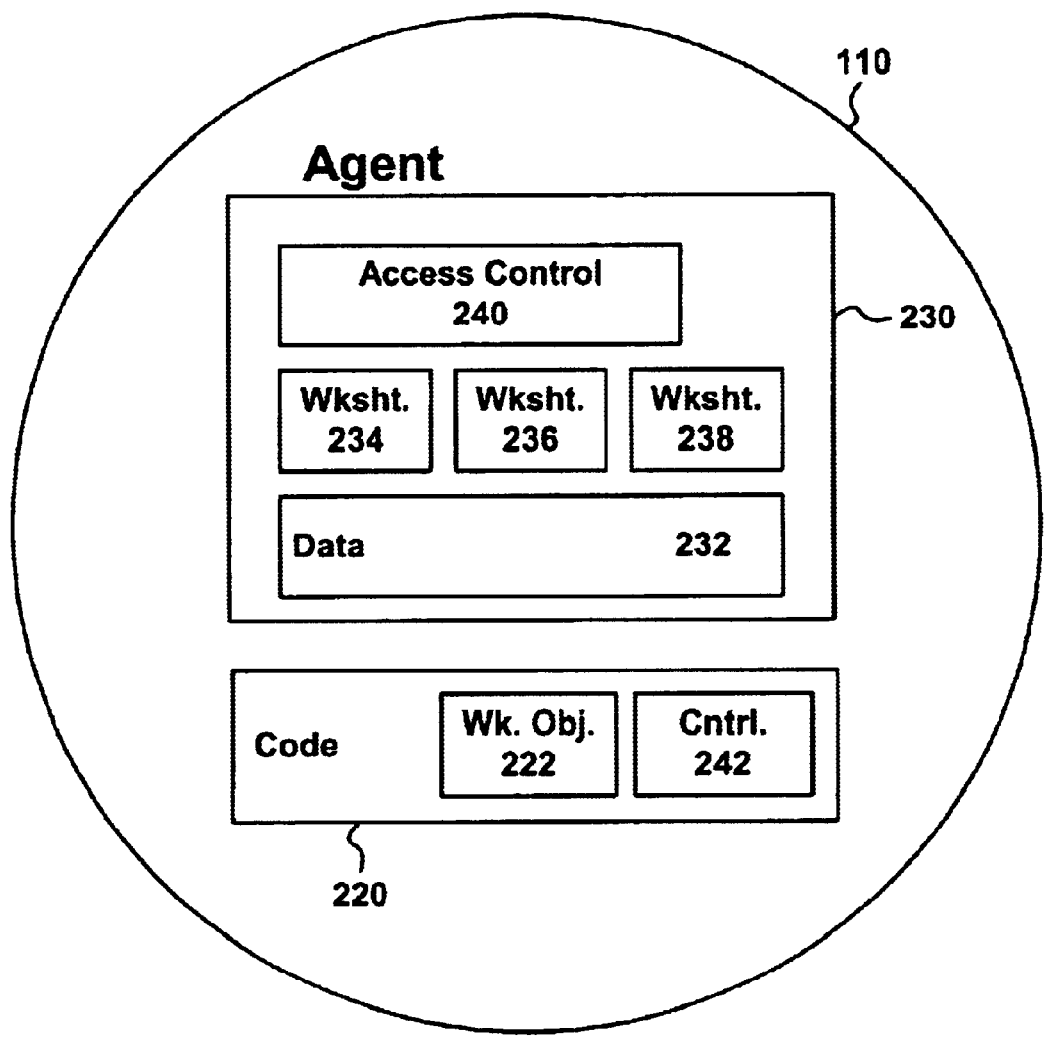
FIG. 4 is a block diagram illustrating the instantiated agent of FIG. 1 according to an embodiment of the present invention.

FIG. 4 is a block diagram illustrating instantiated agent 110 of FIG. 1 according to an embodiment of the present invention. In an exemplary embodiment agent 110 includes code segment 220, which is comprised of Java™ methods which are members of agent 110 and which provide functionality to agent 110; and state 230. Code segment 220 includes work object 222 providing functionality to agent 110. State 230 includes worksheets 234, 236 and 238; work object 222 may use worksheets 234–38 to provide functionality to agent 110. Worksheets 234–38 are members of agent 110 which may be Java™ or non-Java™ language code segments.

Worksheets 234–38 may perform tasks such as monitoring port statistics, CPU utilization, or reachability to other nodes. Worksheets 234–38 may use services to perform some tasks. Code segment 220 includes a controlling method 242, the first method invoked when agent 110 is started on a node, which may contain code controlling agent 110 and executing work object 222. Controlling method 242 controls the overall operation of agent 110; controlling method 110 may invoke other methods of agent 110 or other methods made available by the proactive environment or JVM on which agent 110 operates (not shown).

State 230 includes access control list 240, a list determining, for agent 110, which services may be used on which devices, how those services may be used, and on which devices agent 110 may be run. State 230 includes data segment 232, which contains run time data agent 110 may have instantiated. Access control list 240, work object 222, data 232 and worksheets 234–38 are variables which are members of agent 110. A variable may represent an object, as in the case of work objects. Access control list 240 lists devices on which agent 110 may operate, and for each device the services and, in some cases, capabilities within services, which agent 110 may use on that device. Agent 110 may only operate on the devices listed in access control list 240. Alternate embodiments may provide other methods and structures for recording permissioning of agents. Alternate embodiments may provide a different structure for agents.

In an exemplary embodiment, to ensure the integrity and source of agent 110, when it is transmitted across the network by a transmitting proactive environment it is signed using a digital signature and encrypted. Only authorized entities may decrypt, access and execute agent 110. A proactive environment receiving agent 110 may use the digital signature to ensure the integrity and source of agent 110. Encryption and verification methods are well known. Alternate embodiments may provide other methods for encrypting or protecting agents' data.

Agent 110 may operate in several modes, where each mode dictates how agent 110 may act. For example, if agent 110 monitors a network for an attack it may operate in a monitoring mode, and on detecting an attack may transition to an alert mode. Another type of agent, for example a watchdog agent, may have different modes. The mode in which agent 110 exists is recorded as a variable in state 230. When agent 110 is started on a node (as the result of initial instantiation or after moving) the mode determines the activity controlling method 242, work object 222 or worksheets 234–38 carry out.

In alternate embodiments other methods may be used to create the agents used with the present invention, and the agents used with the present invention may have alternate structures. For example, alternate embodiments may not require agents to have a controlling method, work objects or worksheets. In alternate embodiments the agents of the system and method of the present invention may be implemented using tools other than the Java™ language and the Voyager™ system, such as C++, or a system not having object oriented capability.

A typical JVM allows certain Java™ objects to operate in a "sandbox," and does not allow these objects to have access to resources outside the sandbox. Agents, Java™ objects running inside the sandbox, may access resources outside the Java™ sandbox through services. In an exemplary embodiment services are classes defining objects which contain methods accepting inputs from agents and allowing agents access to resources. The objects are Java™ objects running on the JVM.

In an exemplary embodiment an agent calling a service makes a request for the service to the proactive environment on which the service runs. The proactive environment accesses the agent's access control list to determine if, and to what extent, the agent may access the service. Certain services (and thus the underlying resources) may only be accessed by agents which have the proper permissioning. The proactive environment creates an object which is an instance of the service. If the service may be created so as to provide various levels of capabilities based on permissioning, variables, members of the service object, are set to indicate which aspects of the service the agent may access; this is done per the agent's access control list. In such a case the service methods provide access to resources only if associated variables, indicating permissioning, are properly set. Instantiated services provide methods which accept input from agents and may return output to agents. The service object is passed to the agent, which may call methods of the object to access the underlying resources. When used herein, service may refer to the class defining a service or to an object instantiated based on that service class. Furthermore, an agent accessing or calling a method within a service object may be said to be accessing or calling that service. In alternate embodiments a service may be any system or module allowing an agent to access resources.

A service method may pass data back to a calling agent as a return value, in the manner typical of method or function calls; event handling may also be used to pass data between services and agents.

In one embodiment of the present invention services may grant access to nodes which do not support a proactive environment. A proxy device, a node which can support a proactive environment, may allow an agent access to a node which cannot support a proactive environment (a "legacy device"). An agent may manage devices via services which are provided on a proxy device which can be used to monitor or control managed devices via, for example, SNMP or command line interface ("CLI"). Thus an agent may access, for example, data on a port on a remote device.

Figure 5:
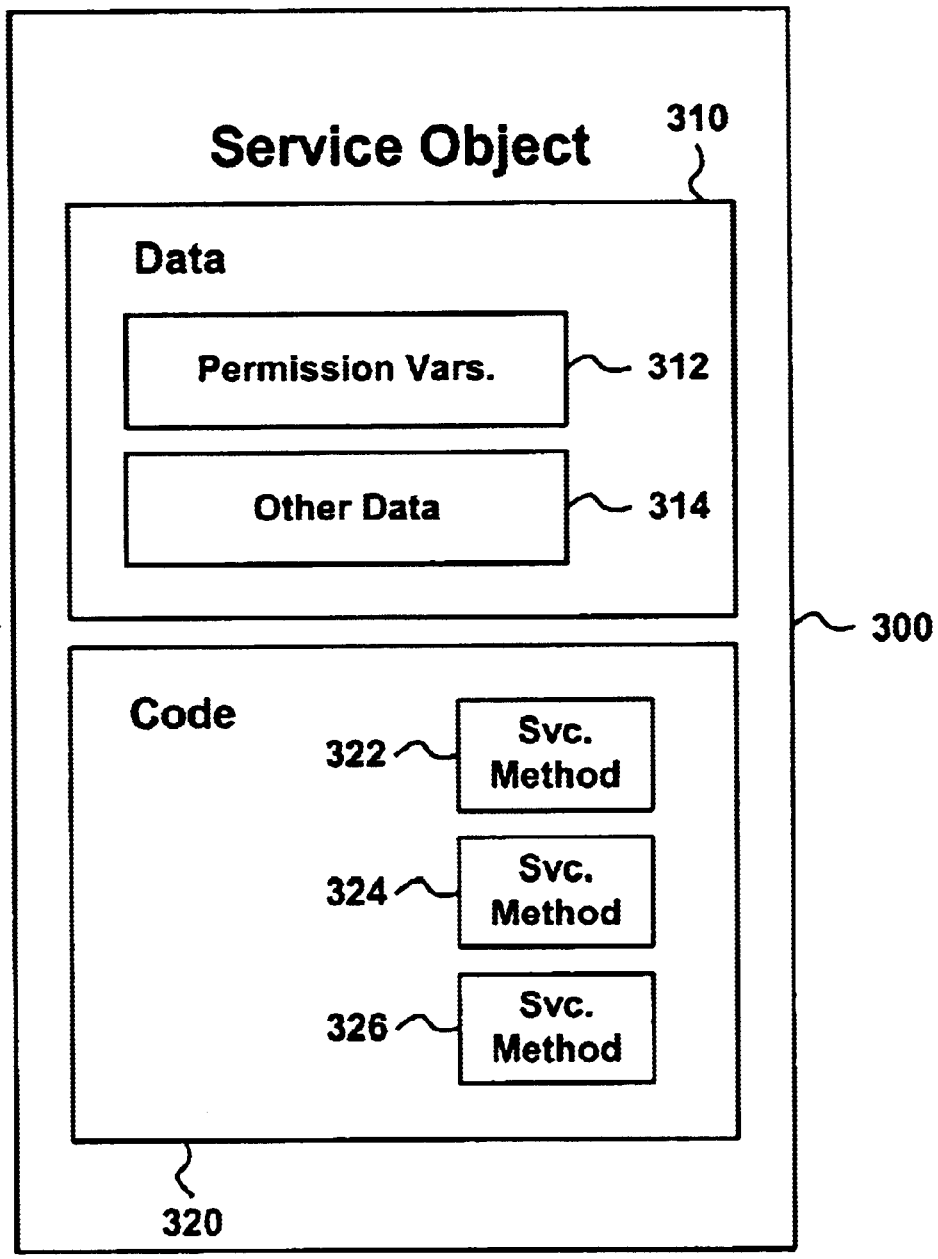
FIG. 5 is a block diagram illustrating a service object instantiated from a service of FIG. 1 according to an embodiment of the present invention.

FIG. 5 is a block diagram illustrating a service object instantiated from service 102 of FIG. 1 according to an embodiment of the present invention. Service object 300 is a Java™ object instantiated from service 102, a class defining a Java™ object. Service object 300 is instantiated for the use of one particular agent, and allows that agent access to a resource. Service object 300 includes data segment 310 and code segment 320. Data segment 310 includes permission variables 312, members of service object 300 which indicate which methods an agent may access and thus to what extent an agent may access the underlying resource. Data segment 310 includes other data 314, which may be necessary for the operation of service object 300. Service object 300 includes code segment 320, which includes methods 322, 324 and 326, allowing agent access to aspects of the underlying resource. Methods 322, 324 and 326 are Java™ language methods. However, service object 300 may include or access non-Java™ language native code—for example, machine code.

Figure 6:
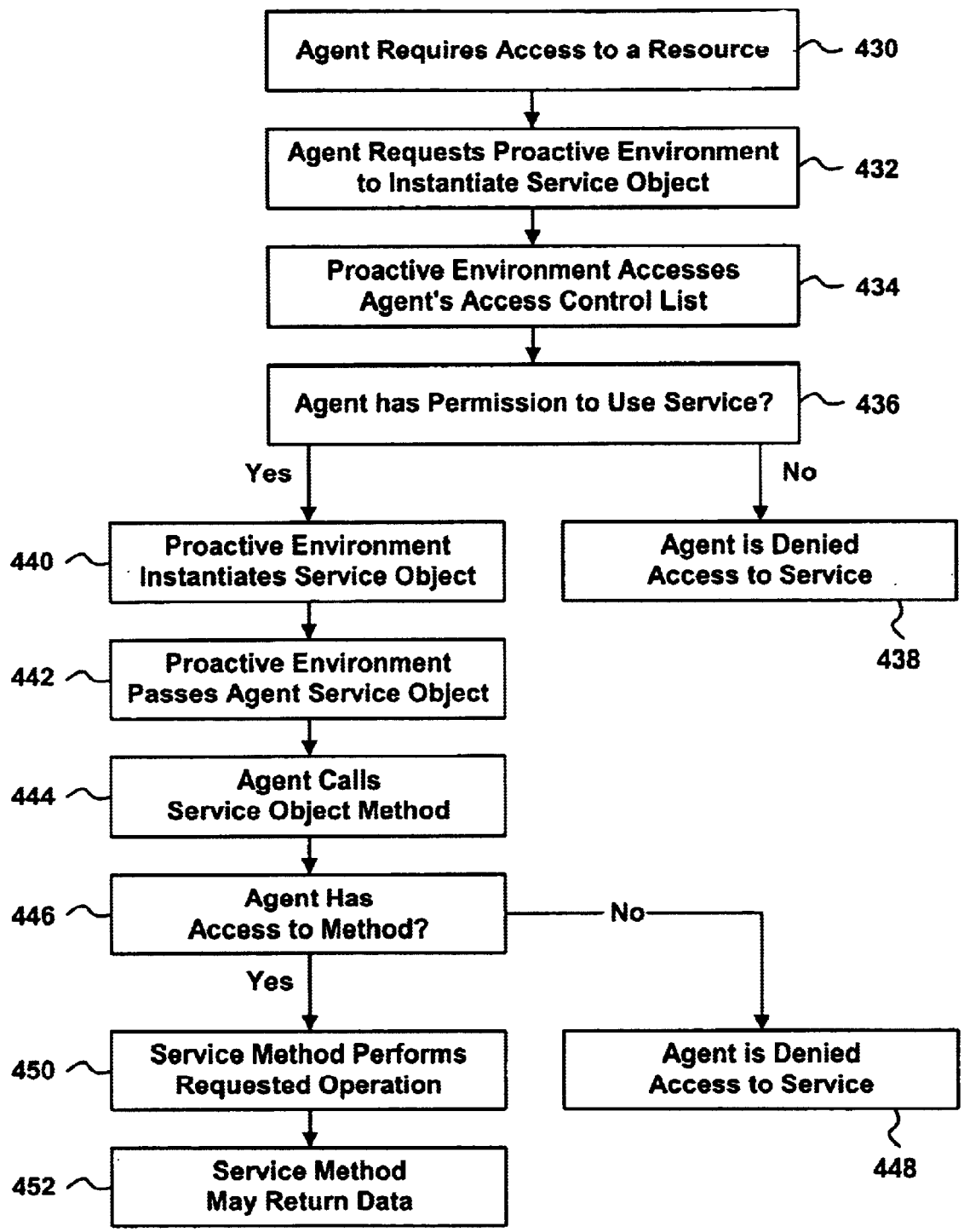
FIG. 6 is a flow chart illustrating the interaction between the instantiated agent and a service of FIG. 1 according to an embodiment of the present invention.

FIG. 6 is a flow chart illustrating the interaction between instantiated agent 110 and service 102 of FIG. 1 according to an embodiment of the present invention.

Referring to FIGS. 1, 4, 5 and 6, in step 430 agent 110 requires access to a resource. For example, agent 110 requires access to operating characteristics stored by port 21, such as the number of dropped packets. Service 102 permits agents limited access to the operating characteristics of port 21 according to an agent's permissioning.

In step 432 agent 110 requests proactive environment 100 to instantiate an object defined by service 102.

In step 434, proactive environment 100 uses methods to read access control list 240 of agent 110.

In step 436, proactive environment 100 uses access control list 240 to determine if agent 110 is an agent which has permission to use service 102 on node 30. If agent 110 does not have permission, proactive environment 100 proceeds to step 438. If agent 110 does have permission, proactive environment 100 proceeds to step 440.

In step 438, agent 110 is denied access to service 102.

In step 440, proactive environment 100 instantiates service object 300 based on the class of service 102. Proactive environment 100 configures service object 300 per the permissioning accessed in step 434. For example, one set of permissioning may allow agent 110 to use service object 300 to read the operating characteristics of port 21 and alter settings for the port, and another set of permissioning may allow agent 110 to use service object 300 only to read the operating characteristics of port 21. Proactive environment 100 sets permission variables 312, members of service object 300, to indicate which aspects of service 102 (in the form of methods 322–326 of service object 300) agent 110 may access.

In step 442, proactive environment 100 passes agent 110 service object 300.

In step 444, agent 110 uses service object 300 by calling one of methods 322–326. For example, if agent 110 calls a port characteristic read method, requesting service 102 to allow agent 110 to read the operating characteristics of port 21, agent 110 passes the service method inputs describing the port name (e.g., "Interface 1") and the field (e.g., dropped packets) requested.

In step 446, the called method determines if agent 110 has access to the particular method requested. If agent 110 has access to the method, per one or more of permission variables 312, the method proceeds to step 450. If agent 110 does not have access to the method, the method proceeds to step 448.

In step 448, agent 110 is denied access to service 102.

In step 450 the service method performs the operation requested by agent 110. For example, the method reads a particular field of the operating characteristics of port 21. Service methods 322–26 are Java™ methods providing access to node 30 and network 4, via JVM 3 and OS 5; the methods are not restricted by the sandbox model.

In step 452 the requested service method may return requested data to agent 110. For example, in the case of reading the operating characteristics of port 21, the service method returns the data as the return value results of a function call.

III. Operation

An exemplary embodiment of the system and method of the present invention detects and diagnoses attacks on networks. One method of attacking a network is a TCP/SYN attack. To establish a TCP/IP connection two devices perform a three way handshake, where a client application, requesting a TCP/IP connection, sends a SYN message to a server application; the server sends a SYN-ACK message in response. To complete the connection the client sends an ACK message. In one method of sabotaging a network or node, a hostile device sends a flood of SYN messages (which can considered to be attack traffic) to a node with no intent of establishing any actual connection. The receiving node responds to each of these messages by sending a SYN-ACK and by allocating space in a data structure used to keep track of TCP/IP connections. The flood of messages quickly uses up all available space in this data structure, and may cause the node to crash or otherwise malfunction. No other device may send SYN messages to the affected node if the node is, for example, a web server, it cannot respond to any new requests.

Other methods of attacking network components exist. For example, the "ping of death" attack involves transmitting a ping message with an abnormally large buffer attached or with other disabling information. Another example is sending frequent ARP broadcasts or IGMP mulitcast queries, or having a malfunctioning node send IP broadcasts, all of which can cause broadcast storms.

Embodiments of the system and method of the present invention may aid in the diagnosis of numerous types or classes of network attacks. For example, the present invention may be used to trace node attacks, such as TCP/SYN attacks or ping attacks. The present invention may be used to trace unauthorized access attacks, such as password attacks (where an unauthorized user attempts to gain access to a node or module using a password) or port-scanning attacks (where an unauthorized user attempts to gain access to a node or module via certain ports). The present invention may be used to trace denial of service attacks (such as UDP flood attacks, ARP broadcast attacks, or attacks causing packet storms), which may cause abnormally high levels of network traffic.

If the source of the attack traffic messages can be identified (by, for example, its IP address) the source can be shut down or disabled. For example, the Internet provider allowing the source device access to the Internet may be notified and may terminate the source device's Internet access. However, through the use of IP spoofing the source of the attack may be obscured. Using IP spoofing the TCP/IP packets constituting the attack traffic indicate a source which is not the actual source device—the sender of the attack traffic inserts a false "return address."

In a network having multiple gateways to other networks, if the particular gateway allowing attack traffic onto the network can be identified, the attack can be halted. Either the gateway can be shut down or the appropriate filter can be installed on the gateway. However, using current methods to identify the gateway which is, in effect, the source of attack traffic to the network can be difficult and time consuming. A network administrator using a sniffer may determine which physical link (of multiple links) on a device receiving attack traffic is the source of such traffic. Certain modules resident on nodes may perform similar functions under the direction of a central console. With such information a network administrator may move from node to node, tracing the path of the hostile messages from the victim to the source, or to the gateway allowing such traffic to enter the network. Such a method of determining the source of messages is slow.

An attacking device may disguise its attack using source routing, where information in each TCP/IP packet dictates the path the packet is to take. Since attacks may be defeated by preventing the attacking device from using a certain path, source routing allows an attacking machine to alter its path in response to such countermeasures. Not knowing the route attack traffic takes makes it difficult to defeat such an attack. An exemplary embodiment of the system and method of the present invention may combat attacks using source routing by quickly enabling the path of attack traffic to be found. When such a path is found, appropriate action may be taken, such as installing firewall entries at the appropriate devices to block such traffic. It may also be helpful to determine a portion of the path taken by attack traffic—for example the path such traffic takes from a gateway to a target device.

In an exemplary embodiment of the present invention, network attacks are detected and diagnosed by two types of agents. Watchdog agents detect network attacks and bloodhound agents to trace the source of attacks. There may be several types of bloodhound agents, each diagnosing a particular type of attack. One or more watchdog agents are deployed, each positioned at a network node supporting a mobile agent environment (such as a proactive environment). On a given network, watchdog agents may be placed at multiple nodes, typically at key points such as routers. While each watchdog agent remains on one network node, bloodhound agents move from node to node to diagnose a network attack. Alternate embodiments may not require separate types of agents; for example, a bloodhound agent may both detect and diagnose network attacks.

In an exemplary embodiment the operation of each agent is dictated by the controlling method of the agent in combination with a work object and worksheets. Both watchdog agents and bloodhound agents are instantiated from the same class and have their functioning differentiated by work objects and worksheets. Each instantiation of a watchdog or bloodhound agent uses only one worksheet; in alternate embodiments multiple worksheets or no worksheets may be used. Shortly after an agent is instantiated it is passed a work object and a JavaScript$^7$ worksheet by invoking a method which is a member of the agent. The work object and worksheet determine the agent's functionality and differentiate the functionality of a watchdog agent and the various types of bloodhound agents. Multiple types of watchdog agents may exist, differentiated by work objects and worksheets.

Figure 7:
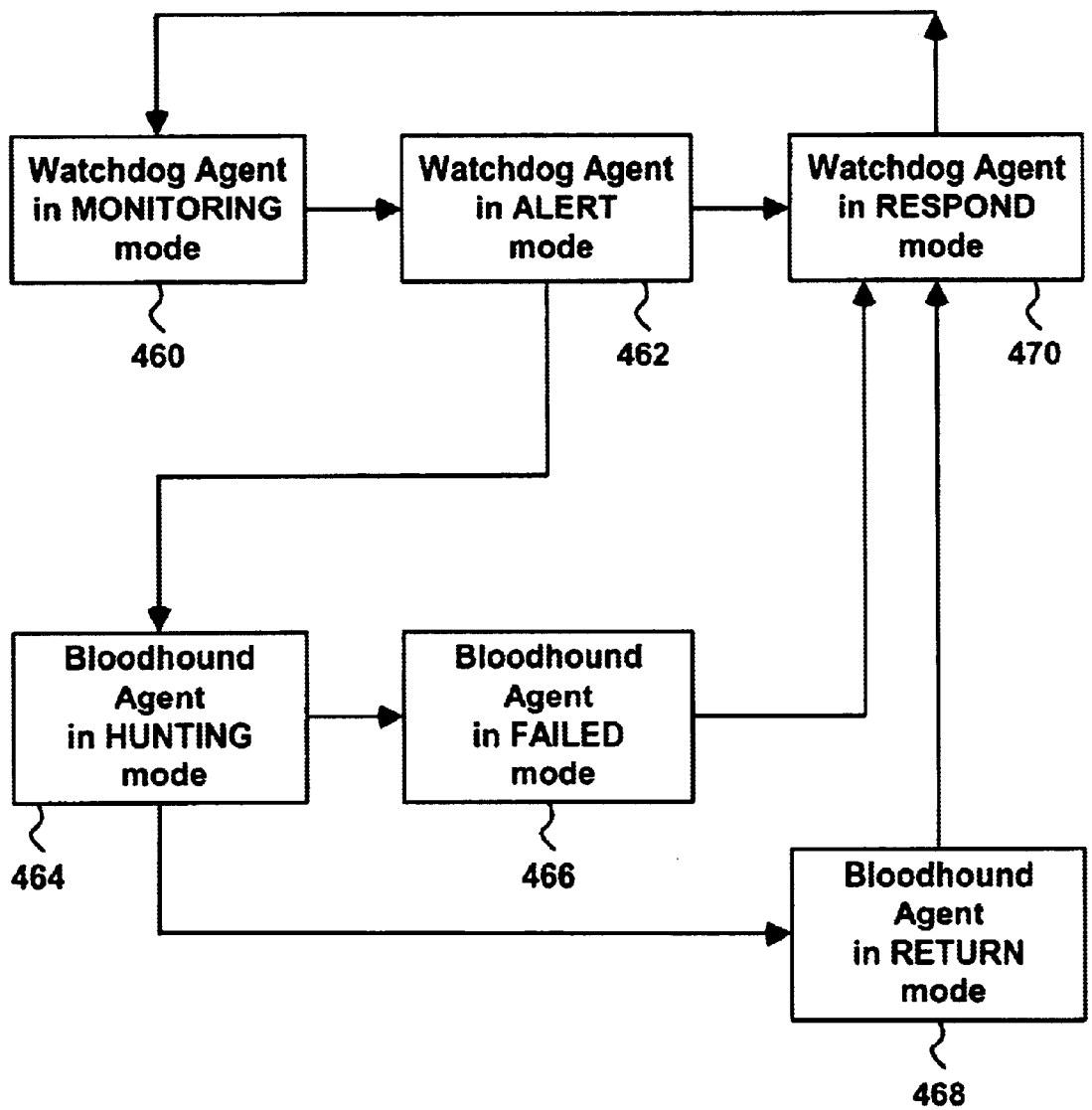
FIG. 7 is a chart illustrating the modes of watchdog and bloodhound agents according to an embodiment of the present invention.

Each agent may exist in multiple modes which determine its actions. FIG. 7 is a chart illustrating the modes of watchdog and bloodhound agents according to an embodiment of the present invention. Referring to FIG. 7, a watchdog agent may exist in monitoring mode 460, where it monitors for network attacks; alert mode 462, where it creates bloodhound agents and waits for bloodhound agents to report; and respond mode 470, where it reports to a network administrator with information about the attack and/or takes measures to block or stop the attack. A bloodhound agent may exist in hunting mode 464, where it analyzes traffic, moving from node to node and recording its path and other information; failed mode 466, if it can no longer find evidence of an attack; and return mode 468, if it cannot trace the attack any further. In both failed mode 466 and return mode 468 the bloodhound agent provides the results of its analysis to the watchdog agent. While specific modes are described, other embodiments may use other modes or sequences of modes without affecting the overall operation or benefits of the present invention. Furthermore, it is not required that modules used with the present invention operate according to modes.

In an exemplary embodiment a watchdog agent may detect a network attack, both at the device on which it operates and on certain remote devices assigned to the watchdog agent, in several manners. A watchdog agent monitors for traffic being received at the node on which it operates having characteristics of a network attack. Various types of network attacks exist, each having different defining characteristics. The methods used to detect each type of attack differ. Furthermore, new methods of attack may be developed. Therefore, new methods of detecting attack traffic may be developed and may be integrated with the system and method of the present invention. The addition of new methods for detecting attack traffic do not affect the overall operation or benefits of the present invention.

One type of attack monitored for is a SYN-ACK attack. In an exemplary embodiment of the present invention, a watchdog agent monitors for SYN packets having invalid return addresses. To do so the watchdog agent monitors incoming and/or outgoing traffic at a node for packets indicating that a SYN-ACK message sent by the node was sent to a device which did not send the previous SYN message, which is not responding or which does not exist. Alternately, the watchdog agent may interface with software controlling the three way handshake protocol and receive an alert that such a situation exists. The watchdog agent also monitors for a ping of death attack, by monitoring for received ping packets having characteristics indicating such an attack; for example, abnormal packet length. The watchdog agent monitors for other types of attacks by monitoring for traffic characteristic of such attacks. A watchdog agent uses its work object and worksheet (which in turn use an SNMP service or another type of service) to monitor incoming and/or outgoing traffic. A watchdog agent may perform attack monitoring using filters $^B$software modules designed to detect a certain type or pattern of traffic. Filters may be dynamically added to a watchdog agent or to a system on which a watchdog agent operates according to a type of attack which may occur.

In an exemplary embodiment a watchdog agent may detect a network attack at a device other than the device on which it operates. A watchdog agent may monitor for an attack on a remote device if, for example, the remote device cannot support a watchdog agent or if a type of attack may occur which cannot be detected at the device being attacked. Each watchdog agent may be assigned a set of devices to monitor. The watchdog agent periodically attempts to make a TCP connection to each assigned remote device. If a connection cannot be made, the watchdog agent presumes a TCP attack is occurring with the remote device as a target. The watchdog agent may use a service to monitor incoming and/or outgoing packets at the remote device, and interpret these packets in the same manner as packets sent from and received at the device on which it operates. A watchdog agent may also periodically determine reachability to an assigned device, using, for instance, a ping message. That other devices in a network are not reachable may indicate an attack on those devices. A watchdog agent uses services to access capabilities such as making TCP connections and ping transmission.

A watchdog agent may assume a network attack exists if network congestion is detected. To detect network congestion a watchdog agent monitors the number of packets which were to be received at the node on which the watchdog agent operates but which have been lost. The watchdog agent detects lost incoming packets by monitoring the TCP/IP stack, maintained in the operating system. If the number of incoming lost packets rises above a certain level the watchdog agent concludes a congestion condition exists. A watchdog agent uses its worksheet (which in turn uses an SNMP service or another type of service) to periodically access the OS to monitor this information. Alternately, a service may be provided to monitor this information directly. In an alternate embodiment a watchdog agent detects network congestion by monitoring interface discard counts and average queue lengths for each port on the node on which it executes. Packets may be dropped by a port if its buffers become full when the port receives packets at a rate which is faster than the rate it can send the packets to its host node—a discard count of such dropped packets may be maintained by a port. The average queue length of a buffer in a port is a measure of how full the buffer is.

In alternate embodiments, other methods may be used to monitor for a network attack. For example, incoming traffic suspected to constitute a network attack may be detected by using monitoring software. A network administrator may monitor traffic and indicate that an attack exists.

In an exemplary embodiment, on the detection of a network attack (or after receiving a message from a human operator via, for example, a management console application) the watchdog agent enters the alert mode. On entering the alert mode the watchdog agent launches one or more bloodhound agents to trace the attack traffic to its source and analyze the paths taken by the attack traffic. Each bloodhound agent is designed to trace traffic from one attack. The watchdog agent launches different types of bloodhound agents based on the type of attack detected. If a TCP/SYN attack is detected the watchdog agent launches a bloodhound agent designed to trace such an attack; such an agent traces TCP/SYN traffic for the targeted device. If another type of attack, such as a ping of death attack, is detected, a bloodhound agent tracing traffic characteristic of such an attack is launched. If appropriate, the watchdog agent is provided with information necessary to trace the attack traffic, such as the IP address of the node being targeted. If an attack is assumed based on network congestion or node unreachability, multiple agents, each tracing traffic based on one type of attack, are launched. In such a case only one type of bloodhound agent may successfully trace the attack, and the bloodhound may not be provided with the identity of the device being attacked.

The watchdog agent waits for each bloodhound agent to report, destroys each bloodhound agent, and either attempts to block or stop the attack or reports to a network administrator.

A bloodhound agent is launched by being instantiated and being provided with a work object and worksheet which provide the bloodhound agent's functionality. Each type of bloodhound agent, tracing a different type of attack, is provided with a different type of worksheet and work object. If the bloodhound agent requires specific information to trace the attack, such as the IP address of the targeted machine, this information is included in the worksheet. For example, a bloodhound agent searching for TCP/SYN attack traffic is provided with a work object and worksheet designed to trace TCP/SYN traffic directed at a certain node; the IP address for the target node is included in the worksheet. In an alternate embodiment, a bloodhound agent need not be launched by being instantiated; for example, a bloodhound agent may exist prior to an attack and may be launched by being directed to trace for attack traffic.

In an exemplary embodiment a bloodhound agent moves across the network, tracing the path or paths taken by attack traffic to the target node, eventually reaching the source of the traffic or coming close enough to the source to provide valuable information about the attack. The bloodhound agent starts tracing traffic at the node which is the target node. The target node may not be the node of the launch point. If an attack is directed at a target node which cannot support agents, the bloodhound agent first moves to the device (typically a router) closest in the network topology to the target node which can support an agent, then begins tracing traffic. In such a case the bloodhound agent may also start tracing traffic from its launch point.

To trace attack traffic, the bloodhound agent follows an iterative process of finding the port for the link on the node on which it operates which is accepting attack traffic (or the most attack traffic), attempting to traverse that link to a new node, and, once at the new node, again finding the port and link which are accepting attack traffic. In such a manner the path or paths, or a portion of the path or paths, of attack traffic between the source of the attack traffic and the target node may be found. It may often be the case that a partial path is found ending at the node at which attack traffic enters the network. Such a node may be considered to be the source of the attack traffic—while it is not the originating source, it is the source of the attack traffic to the network. Such information may be used to set up administrative blocks (e.g, a firewall) to prevent attack traffic from entering the network. After collecting this information the bloodhound agent reports to the watchdog agent. In alternate embodiments, the bloodhound agent may collect other information about traffic on the links which it traverses and nodes on which it operates.

When first launched, the bloodhound agent is in hunting mode. In hunting mode the bloodhound agent searches the various ports on the node on which it operates (initially the target device or the node closest to the target device) for attack traffic. The bloodhound agent is directed to search for attack traffic according to the type of the attack and the target of the attack. The bloodhound agent determines which port is accepting the greatest proportion of attack traffic. In determining which port is accepting the greatest proportion of such traffic, the bloodhound agent thus detects which link connected to the node is accepting and carrying the greatest proportion of such traffic. Since the bloodhound agent may visit the same node twice when searching for attack traffic, to avoid loops it does not analyze ports for links it has previously traversed. The bloodhound agent accesses its node path list to determine whether or not a link has been previously traversed. The node path list is a data structure recording the nodes and ports which a bloodhound agent has visited along with other information, such as the failure to traverse a link or to detect attack traffic.

Each type of bloodhound agent, tracing a particular type of attack, searches for a different type of attack traffic. For example, a bloodhound agent searching for TCP/SYN attack traffic searches for attack traffic comprising SYN messages directed to the target device. A bloodhound agent searching for TCP/SYN attack traffic but which is not provided with an IP address for a target node searches for an abnormally high proportion of SYN messages being received by a device. A bloodhound agent tracing a ping of death attack searches for attack traffic comprising ping messages, possibly directed to a certain target device. A bloodhound agent tracing a denial of service attack searches for such traffic (for example, UDP flood traffic or ARP broadcast traffic). To detect attack traffic a bloodhound agent uses its work object and worksheet (which in turn use an SNMP service or some other service) to monitor incoming and/or outgoing traffic.

If the bloodhound agent attempts to traverse the link but cannot (for example, if the node is outside the network or administrative domain of the bloodhound agent, if the destination node has failed or does not support a mobile agent environment, if the bloodhound agent is not granted permission to operate on the destination node, or if the link is overloaded) the bloodhound agent first records in its node path list that it failed to traverse the link, along with the identity of the node on which it is operating and the port connected to the link which it failed to traverse. The bloodhound agent has traced the traffic as far as it can. The bloodhound agent reports to the watchdog agent.

If no attack traffic is found at a device (for example, if the attack has ceased), the bloodhound agent enters the failed mode and records in its node path list both its failure to find attack traffic and the identity of the node on which it is currently operating. The bloodhound agent then provides a report to the watchdog agent.

If the bloodhound agent can identify a certain link carrying the most attack traffic (using information gathered from the port connected to the link), the bloodhound agent records in its node path list the node on which it is currently operating and the port which is accepting this traffic. In alternate embodiments the bloodhound agent may record other information. After determining which port is accepting the most attack traffic, the bloodhound agent attempts to move to the node on the other end of the link associated with this port. If the bloodhound agent successfully traverses this link, the bloodhound agent, now on a new node, repeats the cycle of analyzing traffic accepted at ports on a node and moving to another node.

To report, the bloodhound agent moves across the network to the node of its launch point and provides its findings to the watchdog agent. The bloodhound agent transmits the data it has collected to the watchdog agent using a messaging service. After reporting, the bloodhound agent is destroyed. In an exemplary embodiment, the bloodhound agent provides to the watchdog agent a report indicating the path or paths (or a portion of the path or paths) taken by the attack traffic and, possibly, the source of the attack traffic. The source may be indicated as a gateway allowing access to other networks; in such a case the indicated source is not the originating source of the attack. The path as described by the bloodhound agent comprises links and nodes. Links may be denoted using pairs of port/node combinations. For example, a link may be denoted as the link connecting port "Interface 2" on node 22.49.1.3 to port "Interface 4" on node 22.49.1.7. In alternate embodiments the findings may include other types of information. In an alternate embodiment the bloodhound agent need not move to its launch point to report its findings; for example, it may transmit the information across the network using a messaging service and then self-destruct.

After a response from the bloodhound agent the watchdog agent transitions to the respond mode. In the respond mode the watchdog agent may attempt to halt the attack. For example the watchdog agent may launch an agent which alters routing tables to prohibit traffic from a given source from entering the network, or may perform such an operation itself The watchdog agent may launch an agent which functions as a firewall; such an agent moves to the point in the network which is the ingress point for attack traffic. The watchdog agent may install several intermediate filters in the network which prevent attack traffic from being forwarded. The watchdog agent may report findings (e.g., the source of the attack; the path or paths taken by attack traffic) to a network administrator. In an exemplary embodiment the watchdog agent communicates with network administrators via a management console application; alternate embodiments may use other methods. The network administrator may use the findings to cure the problem. After attempting to halt the attack or contact an administrator the watchdog agent transitions to the monitoring mode.

Figure 8:
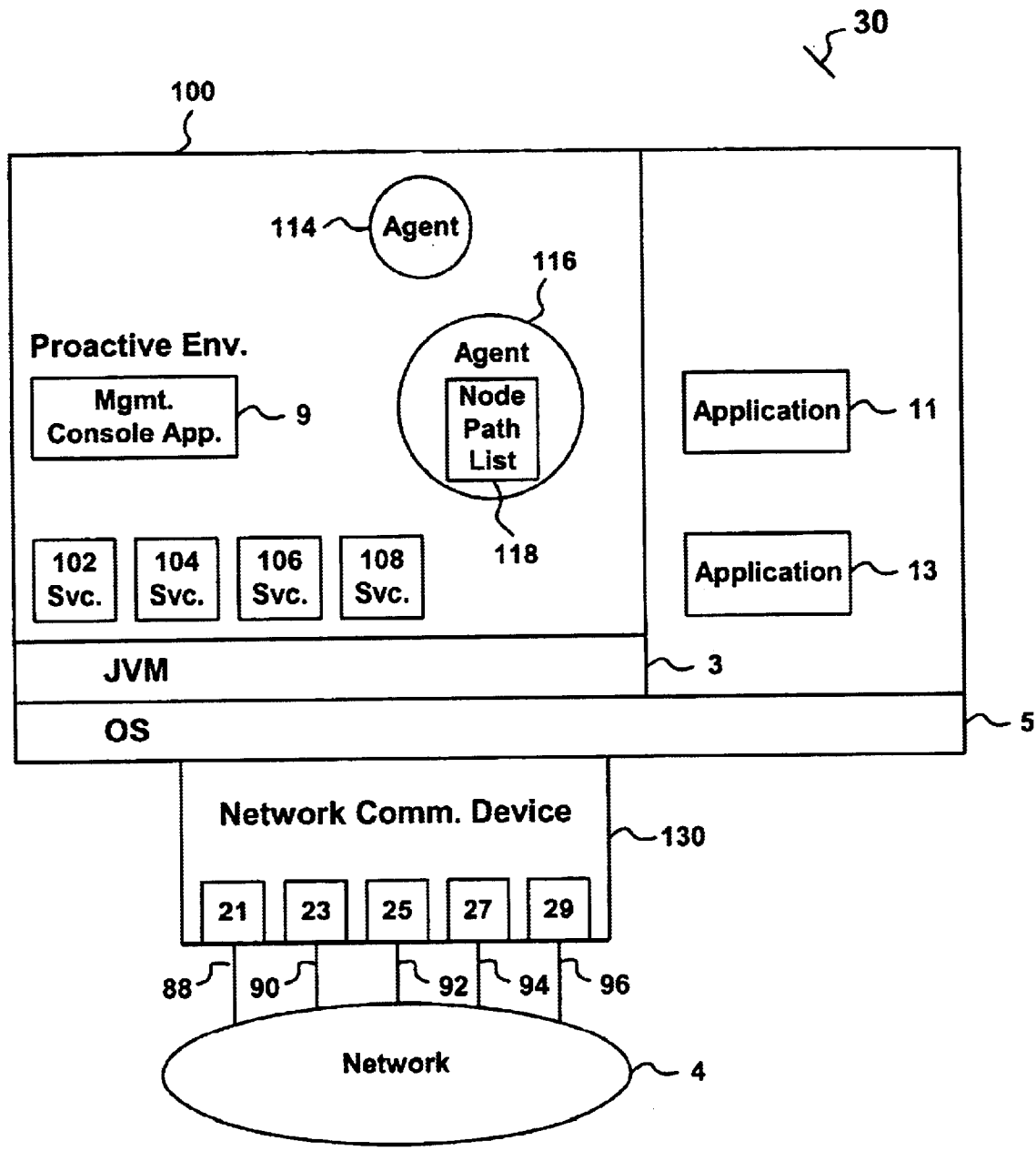
FIG. 8 is a block diagram illustrating the node of FIG. 1 according to an embodiment of the present invention.

FIG. 8 is a block diagram illustrating node 30 of FIG. 1 according to an embodiment of the present invention. FIGS. 1 and 8 illustrate node 30 from different aspects; thus like numbered components are identical in function and structure. Node 30 includes a mobile agent environment, proactive environment 100, which includes services 102, 104, 106 and 108. Node 30 includes OS 5, JVM 3, applications 11 and 13, management console application 9, watchdog agent 114 and bloodhound agent 116. Watchdog agent 114 monitors node 30 or other nodes for network attacks, and, in response, may launch one or more bloodhound agents to diagnose such network attacks. Bloodhound agent 116 is launched by watchdog agent 114 and moves across the network, gathering information about selected traffic. Bloodhound agent 116 may be any of a number of different types of bloodhound agents, each type used for a certain type of network attack. Bloodhound agent 116 includes node path list 118, a data structure which is a member of bloodhound agent 116. Network communications device 130 allows node 30 to connect to network 4 via links 88, 90, 92, 94, and 96 and includes ports 21, 23, 25, 27 and 29. Links 88–96 connect to other nodes in network 4 (not shown).

Watchdog agent 114 and bloodhound agent 116 are instantiations of the same subclass of the base agent object class. Each is provided with a work object and a JavaScript[7] worksheet which provide functionality to the agent. The types of work objects and worksheets given to agents differ and result in the differing functionality of watchdog agents and the various types of bloodhound agents.

Figure 9:
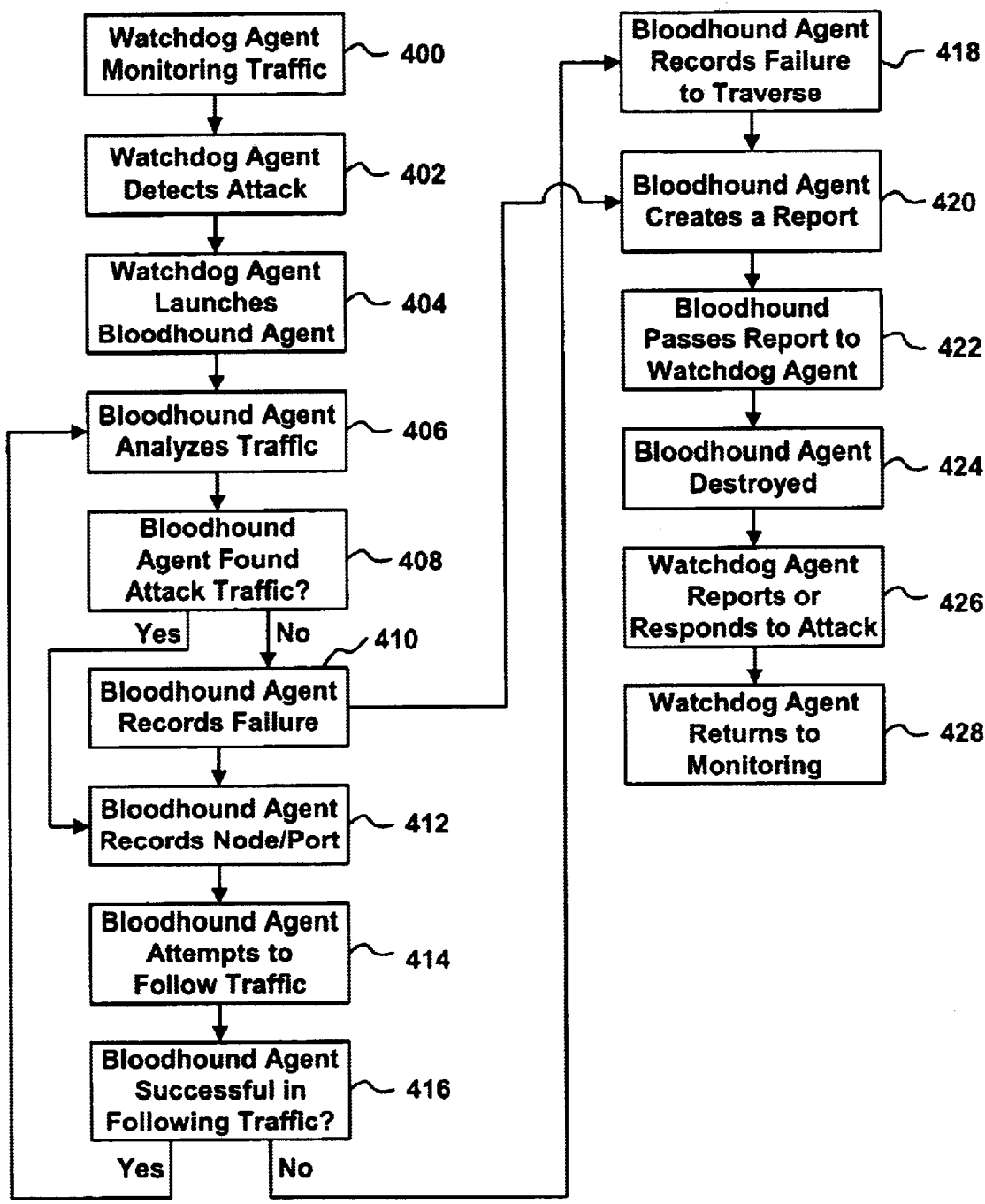
FIG. 9 is a flow chart illustrating the operation of watchdog agents and bloodhound agents according to an embodiment of the present invention.

FIG. 9 is a flow chart illustrating the operation of watchdog agents and bloodhound agents according to an embodiment of the present invention. While specific steps are described, other embodiments may use other steps and sequences of steps without affecting the overall operation or benefits of the present invention.

Referring to FIGS. 7, 8 and 9, in step 400 watchdog agent 114 is in the monitoring mode (FIG. 7, 460). The mode for watchdog agent 114 is recorded as a variable in its state. When watchdog agent 114 is instantiated, this variable is initialized to indicate the monitoring mode. This variable is changed when the mode is changed. At this point, bloodhound agent 116 may not have been instantiated.

In step 402 watchdog agent 114 detects a network attack and enters the alert mode (FIG. 7, 462). For example, watchdog agent 114 finds that node 30 is receiving SYN packets having a false source address. To detect a network attack, watchdog agent 114 uses its work object and worksheet to use one or more of services 102–108 to access ports 21–29 and possibly ports or other resources on other nodes. Each service is instantiated once and remain in existence for the duration of the analysis by watchdog agent 114 of the ports or ports accessed by the service. Watchdog agent 114 periodically calls methods which are members of service objects to access port data. Alternately, watchdog agent 114 reacts to input from a human operator to enter the alert mode.

In step 404 watchdog agent 114 launches bloodhound agent 116 and waits for a response from bloodhound agent 116. The type of bloodhound agent launched is dictated by the type of the attack determined in step 402. Different types of bloodhound agents are given different functionality by being passed different work objects and worksheets. More than one bloodhound agent may be launched depending on the type of attack suspected. For example, if watchdog agent 114 finds that node 30 is the target of a TCP/SYN attack, bloodhound agent 116 is launched with a work object and worksheet directed to tracing such an attack, and the worksheet contains the IP address of node 30, so that attack traffic directed to that node can be traced. Watchdog agent 114 may launch a pre-created bloodhound agent or may instantiate a new bloodhound agent.

Bloodhound agent 116 is launched in the hunting mode (FIG. 7, 464). To instantiate bloodhound agent 116, watchdog agent 114 uses the "new" keyword, using a subclass of the base agent object class. Watchdog agent 114 sends bloodhound agent 116 its work object and the JavaScript[7] worksheet which provide functionality to bloodhound agent 116 by invoking methods which are members of bloodhound agent 116. The methods add the work object and worksheet to bloodhound agent 116. The mode for bloodhound agent 116 is recorded as a variable in its state. When bloodhound agent 116 is instantiated, this variable is initialized to indicate the hunting mode, and this variable is changed when the mode is changed. If the target node is a node other than the launch point, before beginning to trace traffic, bloodhound agent 116 moves either to the target node or, if the target node cannot support agents, to a node topologically closer to the target node.

In step 406 bloodhound agent 116, in the hunting mode, analyzes traffic being received at the node on which it currently executes (its "current node") to identify the port receiving the most attack traffic. Bloodhound agent 116 analyzes traffic according to the type of attack traffic for which it is configured. The initial current node may be the node of the bloodhound agent's launch point, or may be a different node. Bloodhound agent 116 samples packets received by and/or sent by the various ports of the current node to search for attack traffic. Bloodhound agent 116 uses its work object and worksheet to use services to access ports on the current node, ignoring ports connected to links it already analyzed.

In step 408, if bloodhound agent 116 found attack traffic on a port on the current node in step 406, bloodhound agent 116 proceeds to step 412; if bloodhound agent 116 did not find such traffic, bloodhound agent 116 proceeds to step 410.

In step 410, bloodhound agent 116 records the failure to find attack traffic in node path list 118; it may record the name of the current node. Bloodhound agent 116 transitions to the failed mode (FIG. 7, 466). Bloodhound agent 116 proceeds to step 420.

In step 412, bloodhound agent 116 records the name of the current node (the node's IP address) and the name of the port receiving the most attack traffic (e.g., "Interface 2") in node path list 118.

In step 414, bloodhound agent 116 attempts to follow the attack traffic. Bloodhound agent 116 attempts to move to the node on the other end of the link connected to the port recorded in step 412. In such a manner bloodhound agent 116 attempts to move closer to the source of the attack traffic.

In step 416, if bloodhound agent 116 is successful in following the attack traffic by traversing the link, bloodhound agent 116 proceeds to step 406; if bloodhound agent 116 is unsuccessful, bloodhound agent 116 proceeds to step 418. In proceeding to step 406, the node to which bloodhound agent 116 moves becomes the current node and bloodhound agent 116 repeats steps 406–416, having moved closer to the source of the attack.

In step 418, bloodhound agent 116 records that it could not traverse the link, along with other information (for example, the reason for the failure, the current node and the port connected to the link of the failed attempt), in node path list 118. Bloodhound agent 116 transitions to the return mode (FIG. 7, 468).

In step 420, bloodhound agent 116 creates a report, a data structure detailing the information collected. The report may indicate the path or paths (or a portion of the path or paths) taken by the attack traffic and, possibly, the source of the attack traffic. The report may indicate the failure to find attack traffic on a node.

In step 422, bloodhound agent 116 passes its report to watchdog agent 114. Bloodhound agent 116 may move across network 4 to the node of its launch point before sending the report, using its move method. Bloodhound agent 116 passes the report to watchdog agent 114 using a messaging service. Bloodhound agent 116 requests the proactive environment of the launch point to instantiate a messaging service, and calls a method of the messaging service with the report as a parameter. The messaging service transfers the report to watchdog agent 114.

In step 424, bloodhound agent 116 is destroyed. It is known in the art to destroy an object which has been instantiated.

In step 426, watchdog agent 114 may report on or respond to the attack. Watchdog agent 114 transitions to the respond mode (FIG. 7, 470). For example watchdog agent 114 may alter routing tables to prohibit attack traffic or may create an agent which acts as a firewall to prevent such traffic from entering the network. Watchdog agent 114 may report findings to a network administrator. The network administrator may use the findings to cure the problem.

In step 428, watchdog agent 114 returns to monitoring the network for attack, in the monitoring mode.

IV. Conclusion

Several embodiments of the present invention are specifically illustrated and/or described herein. However, it will be appreciated that modifications and variations of the present invention are covered by the above teachings and are within the purview of the appended claims without departing from the spirit and intended scope of the invention.

What is claimed is:

1. A method for analyzing traffic on a network, the network comprising nodes, each node having a set of links, the method comprising:
   at at least a first node on the network monitoring traffic; and
   if a particular network condition is detected, gathering information about the traffic on the network using an agent which:
      identifies which of the links on the node on which the agent operates accepts a class of traffic; and
      traverses the link to the node across the link.

2. The method of claim 1 where the agent repeatedly identifies and traverses links.

3. The method of claim 2 where the network condition is an attack condition.

4. The method of claim 3 where the class of traffic is traffic having identifying characteristics of an attack.

5. The method of claim 4 where the agent, after identifying a link, records the node on which the agent operates and the identified link.

6. The method of claim 2 where the class of traffic is traffic including node attack traffic.

7. The method of claim 2 where the class of traffic is traffic including unauthorized access attack traffic.

8. The method of claim 2 where the class of traffic is traffic including denial of service attack traffic.

9. The method of claim 1 further including:
   launching the agent from a second node.

10. The method of claim 1 where the node on which the agent initially operates is topologically near a node identified as being subject to the attack.

11. A method for analyzing a network, the network comprising nodes, each node connecting to a set of links, the method comprising:
    at at least a first node on the network monitoring for an attack condition; and
    at the first node, when an attack condition is detected, determining a set of traffic suspected to be attack traffic and launching an agent, the agent recording information about traffic by:
       detecting which among the links of the node at which the agent currently operates is receiving the most of a subset of the set of traffic suspected to be attack traffic;
       selecting a link found to be receiving the most of the subset of the set of traffic suspected to be attack traffic and recording the identity of the selected link; and
       attempting to move to the node connected to the selected.

12. The method of claim 11 where the agent repeats detecting, selecting and attempting to move until the agent fails to perform one of detecting, selecting and attempting to move.

13. The method of claim 12 further including:
    recording a set of samples of traffic receive at a node in the network;
    determining, from the set of samples, the type of attack which is occurring; and
    tailoring the agent to follow traffic based on the type of attack.

14. The method of claim 12 where the agent provides a report to a process executing on the first node.

15. The method of claim 12 where the information about the traffic includes at least a set of paths taken by the traffic.

16. The method of claim 12 where monitoring for an attack condition is performed by a monitoring agent.

17. The method of claim 12 where the agent detects which among the links of the node at which the agent currently operates is receiving the most of the set of traffic suspected to be attack traffic by determining which of the links is receiving the most of a certain type of traffic.

18. A system for analyzing traffic on a network, the network comprising nodes, each node having a set of links, the system comprising:
    an agent of to:
       identify which of the links on the node on which the agent operates accepts attack traffic; and
       traverse the link to the node across the link; and
    a module to monitor network traffic, and, when if an attack condition is detected, to gather information about traffic on the network by launching the agent.

19. The system of claim 18 where the attack traffic is identified by filtering for node attack packets.

20. The system of claim 18 where the attack traffic is identified by filtering for unauthorized access attack packets.

21. The system of claim 18 where the attack traffic is identified by filtering for denial of service attack packets.

22. A set of instructions residing in a storage medium, said set of instructions capable of being executed by a processor to implement a method for analyzing attack traffic a network, the network comprising nodes, each node connecting to a set of links, the method comprising:

monitoring traffic at at least a first node on the network; and if an attack condition is detected, gathering information about the traffic on the network by having an agent repeatedly:

identify which of the links on the node on which the agent operates accepts attack traffic; and traversing traverse the link to the node across the link.

23. The set of instructions of claim 22 where the attack traffic is identified by filtering for node attack packets.

24. The set of instructions of claim 22 where the attack traffic is identified by filtering for unauthorized access attack packets.

25. The set of instructions of claim 22 where the attack traffic is identified by filtering for denial of service attack packets.

* * * * *

UNITED STATES PATENT AND TRADEMARK OFFICE
CERTIFICATE OF CORRECTION

PATENT NO. : 6,735,702 B1
DATED : May 11, 2004
INVENTOR(S) : Rajendra Yavatkar et al.

It is certified that error appears in the above-identified patent and that said Letters Patent is hereby corrected as shown below:

Title page,
Item [75], Inventors, "Rajenda" should be -- Rajendra --

Column 22,
Line 30, "selected." should be -- selected link. --
Line 37, "samples of traffic receive" should be -- samples of traffic received --
Line 57, "of to:" should be -- of: --
Line 60, "when if an" should be -- if an --

Column 23,
Lines 5-6, "attach traffic a network" should be -- attach traffic on a network --

Column 24,
Line 3, "traversing traverse the link" should be -- traverse the link --

Signed and Sealed this

Third Day of May, 2005

JON W. DUDAS
*Director of the United States Patent and Trademark Office*